Sept. 2, 1947. B. S. GREENSFELDER 2,426,929
HYDROGENATION OF LIQUID CARBONACEOUS MATERIALS
Filed July 17, 1944
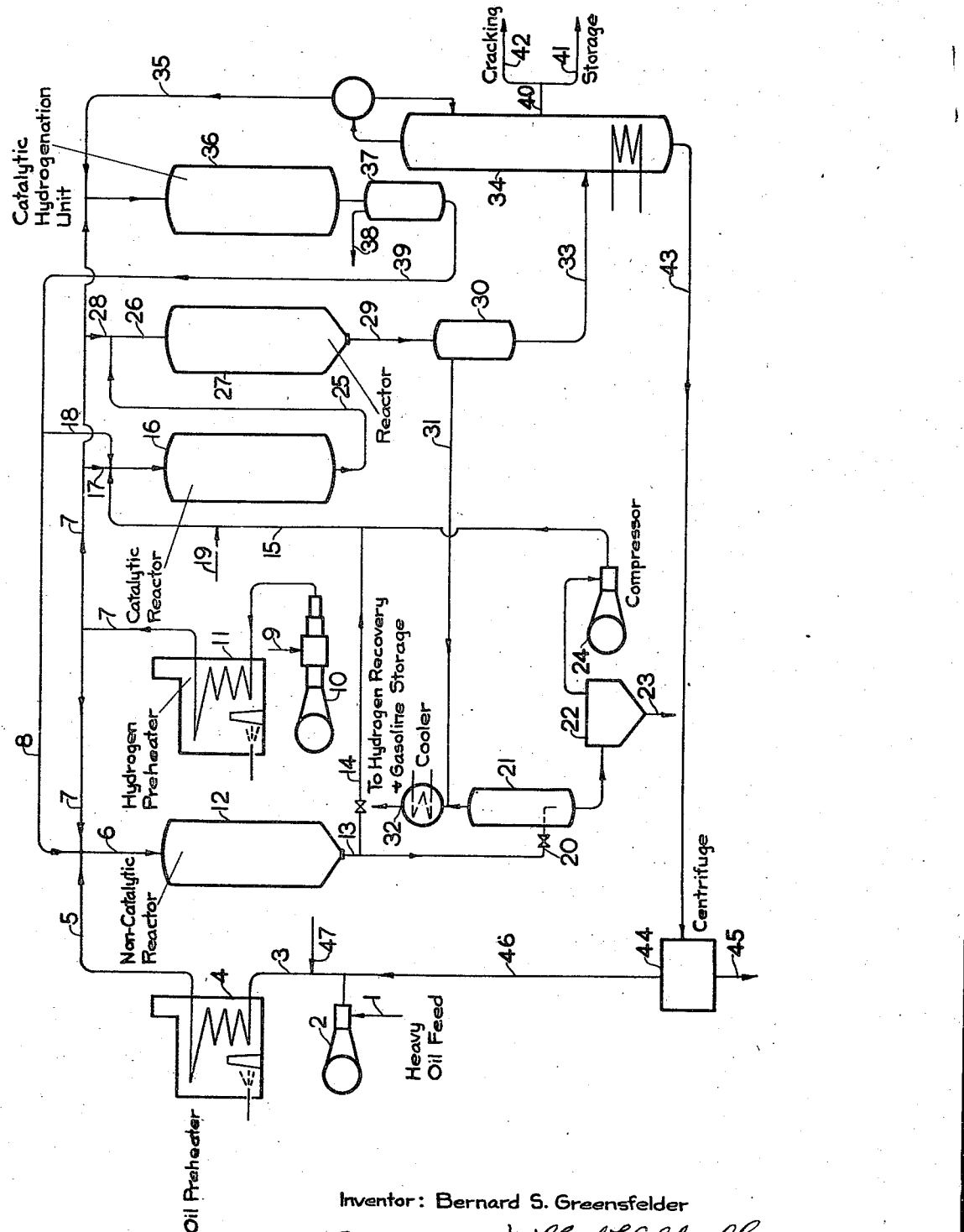
Inventor: Bernard S. Greensfelder
By his Attorney: Millard L. Caldwell

UNITED STATES PATENT OFFICE 2,426,929

HYDROGENATION OF LIQUID CARBONACEOUS MATERIALS

Bernard S. Greensfelder, Oakland, Calif., assignor to Shell Development Company, San Francisco, Calif., a corporation of Delaware Application July 17, 1944, Serial No. 545,401

5 Claims. (Cl. 196—73)

This invention relates to the production of useful materials by the hydrogenation of petroleum residues, shale oil, heavy hydrocarbon oils, the liquid products of destructive distillation, carbonization, extraction, or other suitable treatment of coal, asphalts, pitches and organic substances, and related normally liquid carbonaceous materials. It deals particularly with a new and more advantageous method of carrying out such conversions whereby operability may be improved and plant efficiency increased.

Many different methods for the hydrogenation of higher boiling normally liquid carbonaceous materials have been suggested. Virtually all of the proposed methods have been based upon the reaction of the liquid carbonaceous material with gaseous molecular hydrogen and have involved the use of hydrogenation catalysts. One procedure which has been favored by many inventors comprises hydrogenation in the liquid phase using finely divided catalyst suspended in a carbonaceous liquid residue. The use of larger catalyst particles disposed in a fixed bed through which a liquid residue is passed under hydrogen pressure has also been advocated. In either of these types of operation chemical and mechanical difficulties are encountered. With suspended catalysts, for example, recovery of the catalyst from the hydrogenated residues leaving the system involves cumbersome extractive processes, while fixed bed catalysts quickly become impregnated with carbonaceous deposits so that decarbonizing operations are required after relatively short processing periods. Both of these procedures for dealing with spent catalysts reduce overall plant efficiency.

One of the objects of the present invention is to overcome the foregoing and other disadvantages of prior methods of hydrogenating higher boiling liquid carbonaceous materials. More specifically, one object of the invention is to entirely avoid or at least to reduce the laborious procedures of catalyst recovery and/or regeneration in such processes. Another object is to provide a process whereby carbonaceous materials may be converted to lower boiling hydrocarbons more effectively and at higher rates of conversion than heretofore. Still another object is to carry out such processes in a plurality of stages each operated under the most appropriate conditions to secure overall optimum results. Further objects and advantages of the new process will be apparent from the following description of the preferred methods of applying the principles of the invention.

According to the present invention, the use of hydrogenation catalysts is eliminated in at least the initial stage of hydrogenation of normally liquid carbonaceous materials. This noncatalytic method of operation is made possible by the use of hydrogen carriers, i. e. organic compounds capable of providing the necessary hydrogen for the reaction, instead of depending upon hydrogenation with gaseous hydrogen. The elimination of hydrogenation catalysts in the first hydrogenation stage of treatment obviates the difficulties encountered in recovery and/or regeneration of catalyst which are characteristic of previous methods of hydrogenating this type of material. After it has given up its transferable hydrogen the carrier is separately hydrogenated and recycled to the reaction. Either or both of these hydrogenation steps may be carried out in a plurality of stages and the use of catalysts in one or more stages of the first step employing a hydrogen carrier may be desirable as will be pointed out more fully hereinafter.

As hydrogen carriers for the process of the invention, partly or wholly hydrogenated aromatic derivatives which are readily separated and recovered after they have given up their hydrogen are preferred. Particularly advantageous are, for example, the partly or wholly saturated hydrogenation products of benzene, naphthalene, methyl naphthtalene, dimethyl naphthalene, indan, anthracene, phenanthrene and homologs thereof. Products of complete hydrogenation of such aromatic hydrocarbons are not necessary, as partially saturated products are also effective, although the proportional amount of carrier which will be required will of course depend upon its content of transferable hydrogen. Such carriers may be readily recovered from the hydrogenation products by fractionation. Chemical treatment to remove sulfur, oxygen or nitrogen compounds or other undesirable impurities and/or solvent extraction to separate the aromatic compound or compounds from aliphatic hydrocarbons present therewith may be advantageous prior to the rehydrogenation step of the process depending upon the particular materials involved and the rehydrogenation procedure adopted.

A wide variety of methods may be used for rehydrogenation of the hydrogen carrier. Hydrogenation catalysts such as tungsten, molybdenum and nickel sulfides, or combinations thereof, are particularly suitable because of their immunity to poisoning by impurities, particularly sulfur compounds, in the feed. However, other hydrogenating catalysts such as active metals or oxides may be used. Thus, for example, Raney nickel or reduced nickel with or without suitable supports or carriers such as kieselguhr, majolica, alumina, etc., may also be employed.

The reaction conditions which will be most suitable for the rehydrogenation will depend upon the hydrogen carrier chosen and the catalyst used therewith. With the preferred metal sulfide catalysts, naphthalene type hydrogen carriers are advantageously hydrogenated at temperatures of about 150° C. to 500° C. using a substantial stoichiometric excess of hydrogen under a pressure of about 10 to 400 atmospheres. With more active catalysts such as reduced nickel, for example, lower pressures, for instance, about 1 to 10 atmospheres, are suitable.

The resulting hydrogenated aromatic derivative is added to the carbonaceous material to be hydrogenated in an amount sufficient to yield the requisite amount of hydrogen for the desired conversion. In calculating the amount to add it may be generally assumed that the carrier will be converted to the original aromatic compound but under some reaction conditions less complete liberation of hydrogen may take place and consequently more hydrogen carrier should be used. In general, the quantity of hydrogen required will vary from less than 1% by weight of the charge for certain petroleum oils up to the range of about 5% to 10% for asphalts, pitches, tars and the like. Usually it will be preferable to employ an amount of hydrogen carrier in excess of that required to supply the minimum amount of hydrogen necessary. For example, when using decahydronaphthalene as the hydrogen carrier, it is generally advantageous to employ between about 0.05 and 2.0 volumes of the carrier per volume of liquid carbonaceous material being hydrogenated. With less completely hydrogenated hydrogen carriers, larger proportions of carrier are desirable and it is preferred to use tetrahydronaphthalene, for example, in a ratio of about 0.125 to 5.0 volumes per volume of liquid feed stock. The resulting mixture of hydrogen carrier and carbonaceous material to be treated is passed through a hydrogenation reactor, preferably together with free hydrogen. At a temperature above 300° C. and with pressures above about 40 atmospheres the desired conversion may be effected in from one-half minute to about 8 hours depending upon the reactants and catalysts involved. Lower temperatures give less efficient conversion and temperatures higher than about 550° C. are preferably not used because they generally tend to cause excessive cracking and produce an undesirable amount of low boiling materials which may complicate subsequent recovery of the hydrogen carrier. Free hydrogen in a mean mole ratio to feedstock varying from 0.1 to 40 may be employed in the process. A hydrogen pressure between 40 and 800 atmospheres is preferred, as higher pressures unduly increase plant charges without providing sufficient compensating benefit. It is possible, and in some cases may be advantageous, to omit the use of hydrogen and to maintain the desired pressure by other workable means.

The hydrogenation of the carbonaceous feedstock may be advantageously carried out in several stages. Where asphaltic or heavy residual petroleum components are being treated these are preferably first brought into a proper state of fluidity, for example by heating at temperatures up to about 550° C. in intimate contact with the hydrogen carrier. The starting material may also contain dispersed solids which do not substantially interfere with the process of the invention. Other suitable compounds which are miscible with the liquid carbonaceous material being hydrogenated, for example naphthalene, cresol, or their homologs, may be also added at this point. This treatment may in itself be effected in a series of operations at successively higher temperatures with separation of insoluble material after at least the last treatment. With certain liquid carbonaceous materials such operations may not be necessary but even in such cases it is desirable to preheat the feed before introducing it into the hydrogenating unit. In accordance with the invention, at least the first stage of the hydrogenation is carried out noncatalytically under the previously indicated operating conditions. In this stage hydrogen is transferred from the hydrogen carrier to the carbonaceous material being treated. No problem of catalyst decarbonization or catalyst recovery from heavy residues leaving this stage is encountered and the product has a materially increased fluidity and stability which greatly facilitate further treatment. A later stage or stages of hydrogenation may accordingly be advantageously carried out in the presence of hydrogen and catalysts which promote simultaneous rehydrogenation of the hydrogen carrier and hydrogenation of the material undergoing treatment. Operations with catalyst in a fixed bed are especially advantageous for this purpose. Preferred catalysts are sulfides of tungsten, nickel, iron, cobalt and molybdenum or mixtures of two or more such sulfide catalysts. The corresponding oxides of such metals or the sulfides and/or oxides of chromium, titanium, vanadium, manganese, columbium, etc., or oxides of silicon, aluminum, boron, magnesium, zirconium and zinc may also be used. Mixtures of these catalysts, especially alumina-boric oxide mixtures with or without sulfides of tungsten, nickel or the like, are advantageous. Sulfide and oxide catalysts may, for example, be formed in place by reaction of the free metals or alloys thereof with sulfur and oxygen compounds in the oil being treated. It is also feasible to use catalysts such as tin or lead and halogens such as iodine, chlorine or bromine, or compounds of these elements, such, for example, as tin halides or sulfides or the like which may be added in minimal amounts, for example 0.5% by weight or preferably less, to the carbonaceous feedstock. Fixed catalysts, particularly sixth and eighth group metal sulfides, may also be advantageous even when using catalysts added to the feedstock. Where more than one catalytic hydrogenation treatment is employed the catalysts in the different stages may be the same or may be different. For example, the first such stage may be one in which rehydrogenation of the hydrogen carrier is the reaction predominantly favored while the next stage may be one in which transfer of hydrogen from the carrier to the material undergoing treatment is mainly promoted, and a third stage may be one in which the direct hydrogenation of the feedstock is effectively catalyzed. In such methods of operation catalysts, such as tin and the halogens, or their compounds, are especially suitable for promoting the carrier rehydrogenation concurrently with the hydrogen transfer reaction, while sixth or eighth group metal sulfides are preferred for directly hydrogenating the feedstock, When operating with a plurality of hydrogenation steps, each may be controlled as to temperature, pressure, ratio of hydrogen to feedstock and flow rate to take advantage of the most appropriate conditions for each of the stages, which will depend upon the kind and amount of catalysts used therein (if any), the nature of the carbonaceous material being treated and the particular hydrogen carriers chosen, but in general will be within the ranges previously indicated. In all cases it is preferred to carry out the catalytic step or steps of the process with a substantial excess of hydrogen present.

An alternative procedure which offers advantages in some cases is to employ in the catalytic stage or stages of the process a combination of catalysts which promote both hydrogen transfer and rehydrogenation of the carrier, as well as direct hydrogenation of the feedstock. Thus, for example, a fixed bed of tungsten and molybdenum sulfide catalyst may be used with a feed containing a small amount of stannous hydroxide. Such methods of operation have the advantage of reducing the number of hydrogenation stages necessary but involve some sacrifice, in that the most appropriate conditions for each of the several reactions involved in the process cannot usually be applied. When finely divided catalyst is added to the feed, it very generally must be recovered for economic reasons. However, the process of the invention offers the advantage that even in such cases, the recovery and reclamation of the catalyst are easier and less expensive because both the catalyst and product are much less contaminated with coke, polymers and insolubles due to the initial noncatalytic treatment. A similar advantage is obtained in the method of operation employing catalysts in the form of a fixed bed which may be reactivated in place, or as a moving bed of catalyst which may be continuously reactivated and returned to the process without interrupting the hydrogenation. The use of powdered or fluid type catalysts is also within the scope of the invention.

As a rule when only one catalytic hydrogenation stage is to be used, it is preferred that it be operated so as to favor rehydrogenation of the hydrogen carriers employed, since as previously pointed out, the carriers are preferably aromatic derivatives which are able to transfer hydrogen to the feedstock in the absence of added catalysts. This catalytic rehydrogenation stage may be operated under conditions more intense, especially with respect to temperature, than the first noncatalytic stage, since the feedstock has been partially hydrogenated and has thus been rendered more stable. It is sometimes preferred that the last stage in the hydrogenation treatment be noncatalytic, at least with respect to hyrogenation of the carrier, in order to utilize all transferable hydrogen in the carrier by favoring its conversion to the original aromatic compound. This conversion will also facilitate its recovery and most effective separate rehydrogenation.

The attached drawing shows, diagrammatically, an assemblage of apparatus, not drawn to scale, suitable for the treatment of heavy oils according to one of the preferred forms of the invention.

As shown in the drawing, the liquid feedstock is supplied by a line 1, from a source not shown, to a pump 2 delivering it by line 3 through a preheater 4 and line 5 to line 6 in which it may be mixed with hydrogen introduced by line 7 and a hydrogenated aromatic hydrocarbon such, for example, as a hydronaphthalene from line 8. The hydrogen, or other gas, from a source not shown, is introduced by line 9 to a compressor 10 capable of producing pressures up to 200 to 800 atmospheres and is preheated in heater 11 before passing to line 7. Line 47 is provided for introducing into the feed mixture any of the previously mentioned fluidity increasing agents, such as cresol, naphthalene, etc., which it may be desirable to add. The mixture of heavy oil, hydroaromatic compound, hydrogen and other added compounds, if any are used, passes through reactor 12 where it is maintained at a temperature exceeding 300° C., by means not shown, for about 10 to 150 minutes. Reactor 12 may advantageously be a closed cylinder of suitable construction to withstand the applied pressure or may be a coil of pressure resistant piping or may have other forms. With cylindrical type reactors, packing which will promote turbulent flow of the reaction mixture is advantageous. Metal turnings are particularly suitable for such packing because they also act as heat transfer media and help to maintain a more uniform reaction temperature, but baffles or other mixing means may be used. Catalysts, however, are not used in reactor 12, the reaction therein being intended to be predominantly a direct chemical reaction essentially involving the transfer of hydrogen from the hydroaromatic carrier to the feedstock. It will be understood that suitable metering devices or other means, not shown, are provided to control the flows of all materials entering the system and to insure that a proper proportion of hydroaromatic compound from line 7 mixes with the feedstock to supply sufficient hydrogen for the desired extent of reaction.

The reaction products from unit 12, pass by lines 13 and 14 to line 15 feeding into reactor 16. Separate quantities of hydrogen and hydroaromatic compound, may if desired, be introduced by lines 17 and 18 respectively. Reactor 16 is preferably packed with a suitable hydrogenation catalyst, for example, tin sulfide on a support, although other types of catalyst, as previously indicated, may be used and it is also feasible to use catalysts in a finely divided form, for which purpose a supply line 19 is provided. As a rule it is preferable to feed the products of reactor 12 to reactor 16 via lines 13 and 20 feeding to gas separator 21 and residue separator 22 from which coke, insolubles, etc., issuing from the first stage are removed by line 23. The separated hydrocarbons may then be fed by pump 24 to line 15. Where suspended instead of fixed catalysts are used in reactor 16, similar means, not shown, are also provided for recovering the added catalyst from the effluent of the reactor withdrawn by line 25. With the alternative fixed catalyst the reaction mixture may be passed directly from line 25 to line 26 feeding reactor 27. Reactor 27 may be of the same form as reactor 12 since its most important function is the transfer of hydrogen from hydroaromatic compound either remaining unreacted from reactors 12 and 16 or formed by rehydrogenation in reactor 16, and not subsequently fully dehydrogenated therein, to the hydrocarbons undergoing treatment. Additional hydrogen may be supplied to reactor 27 by line 28 and somewhat more drastic reaction conditions may be maintained therein than are used in reactors 12 and 16 in order to bring about more complete conversion of the hydroaromatic hydrocarbon present. Reaction products from noncatalytic unit 27 pass by line 29 to gas separator 30 which advantageously is maintained at a temperature and pressure suitable for separation of all products lower boiling than the added hydrogen carrier in any of its states of hydrogenation. Such lower boiling products are removed by line 31 to cooler 32 to which similar products from units 12 and 16 may also be fed if separation between each stage is being employed as previously described. The cooled lower boiling products are treated in the usual way for separation of the hydrogen which may be returned to line 9 while the hydrocarbons, including the gasoline boiling products are sent to storage. The higher boiling products from separator 30 are fed by line 33 to a distillation unit 34 which may comprise more than the one still shown, wherein the hydrogen carriers are taken off overhead by line 35 and are fed together with preheated hydrogen from heater 11 to catalytic hydrogenation reactor 36 which is preferably supplied with a sixth and/or eighth group metal sulfide catalyst and is maintained at a temperature of about 150° C. to 500° C. and under a pressure of about 10 to 400 atmospheres. The excess hydrogen is separated from products of this reaction in gas separator 37 and withdrawn by line 38 while the hydroaromatic products are removed by line 39 and fed to lines 8 and 18 for reuse in the process as previously described. Higher boiling products of about 300° C. to 375° C. end point are removed by line 40 and may be either conveyed by line 41 to storage prior to fractionation, final treatment and use as burner oil, premium fuel oil, Diesel oil, or for the manufacture of high quality oils for special usages etc., or may be passed through line 42 to cracking units, not shown, where they may be reacted, either with or without hydrogen and in either the presence or absence of catalysts, to obtain increased yields of lower boiling hydrocarbons. Higher boiling products are taken off as bottom product by line 43 and conducted to a separating zone 44 which may advantageously include mechanical or other means for removing coke and any other constituents of limited solubility which are taken off by line 45. The remaining heavy oil is then recycled by line 46 to mix with the feed in line 3.

It will be seen that the process of the invention offers many advantages over prior methods of hydrogenating carbonaceous materials, particularly in regard to the efficiency and facility of operation which results from the use of a hydrogen carrier capable of effecting the desired hydrogenation under noncatalytic conditions and with respect to the improved quality of products obtained by carrying out the operations in a series of steps each controlled so that the individual reactions or separate groups of reactions are effected under the conditions most favorable therefor. The process is especially adapted for the hydrogenation of high boiling normally liquid carbonaceous materials containing at least 5% hydrogen by weight. With feedstocks of lower hydrogen content larger amounts of hydrogen carrier must be circulated to achieve the same result and the net capacity of the apparatus is correspondingly reduced.

The invention is capable of extensive variation not only in relation to the carbonaceous feedstocks which may be used but also in the details of operation employed. For example, instead of, or in addition to the fractionation procedure described for recovery of the hydrogen carrier, solvent extraction methods using liquid sulfur dioxide, furfural, phenol, dichlorethyl ether or the like may be employed to aid in the recovery of the aromatic hydrocarbons to be rehydrogenated. Furthermore, separation of the hydrogen carrier from the material under treatment may be carried out following the non-catalytic hydrogenation or between the different stages of catalytic hydrogenation either in addition to or instead of the separation following the last stage of treating. Whether or not such intermediate separations are made, it may be desirable to add hydrogen carrier to other hydrogenation stages than the first. Still other variations in the process may be made without departing from the principles of the invention which, it will be seen, is not limited to the procedures described by way of example nor by any theory advanced in explanation of the improved results obtained.

I claim as my invention:

1. A method of hydrogenating high boiling carbonaceous material which comprises feeding said high boiling carbonaceous material, a naphthalenic hydrogenation product and hydrogen to a reactor maintained at a temperature of at least 300° C., withdrawing reaction products therefrom and passing them to a catalyst chamber containing a hydrogenation catalyst under hydrogenating conditions, removing reacted mixture from the catalyst chamber and flowing it through a non-catalytic reaction zone at a temperature and pressure at which hydrogen is transferred from the naphthalenic hydrogenation product present to the carbonaceous material undergoing treatment, fractionating the reaction products to separate an overhead stream containing naphthalenes, a middle fraction of higher boiling hydrocarbons and a heavier fraction containing residual solids, removing said residual solids from the latter, recycling at least a part of the remaining hydrocarbon content to the first reaction stage and separately hydrogenating the naphthalenes present in said overhead stream to produce said naphthalenic hydrogenation product for said reaction.

2. A method of hydrogenating high boiling carbonaceous material which comprises feeding said high boiling carbonaceous material, an aromatic hydrocarbon hydrogenation product and hydrogen to a reactor maintained at a temperature of at least 300° C., withdrawing reaction products therefrom and passing them to a catalyst chamber containing a hydrogenation catalyst under hydrogenating conditions, removing reacted mixture from the catalyst chamber and flowing it through a noncatalytic reaction zone at a temperature and pressure at which hydrogen is transferred from the aromatic hydrocarbon hydrogenation product present to the carbonaceous material undergoing treatment, fractionating the reaction products to separate a stream containing the dehydrogenation product of said aromatic hydrocarbon hydrogenation product, a fraction containing hydrogenation products of the reaction and a higher boiling fraction, recycling at least a part of the latter to the first reaction stage and separately hydrogenating said dehydrogenation product to produce the aromatic hydrocarbon hydrogenation product for said reaction.

3. A method of hydrogenating high boiling carbonaceous material which comprises feeding said high boiling carbonaceous material, an aromatic hydrocarbon hydrogenation product and hydrogen to a reactor maintained at a temperature of 300° C. to 550° C., withdrawing reaction products therefrom and passing them to a catalyst chamber containing a hydrogenation catalyst under hydrogenating conditions, removing reacted mixture from the catalyst chamber and flowing it through a non-catalytic reaction zone at a temperature and pressure at which hydrogen is transferred from the aromatic hydrocarbon hydrogenation product present to the carbonaceous material undergoing treatment, fractionating the reaction products to separate a fraction containing hydrogenation products of the reaction from higher boiling hydrocarbons containing residual solids, removing said residiual solids from the latter, and recycling at least a part of the remaining hydrocarbon content to the first reaction stage.

4. A method of hydrogenating high boiling carbonaceous material which comprises feeding said high boiling carbonaceous material, an aromatic hydrocarbon hydrogenation product and hydrogen to a reactor maintained at a temperature of 300° C. to 550° C., withdrawing reaction products therefrom and passing them to a catalyst chamber containing a hydrogenation catalyst under hydrogenating conditions, removing reacted mixture from the catalyst chamber and flowing it through a non-catalytic reaction zone at a temperature and pressure at which hydrogen is transferred from the aromatic hydrocarbon hydrogenation product present to the carbonaceous material undergoing treatment, fractionating the reaction products to separate a stream containing the dehydrogenation product of said reaction from a fraction containing hydrogenated hydrocarbons produced therein and hydrogenating said separated dehydrogenation product to produce said aromatic hydrocarbon hydrogenation product for use in the first reaction stage.

5. A method of hydrogenating high boiling carbonaceous material which comprises feeding said high boiling carbonaceous material, a hydroaromatic hydrocarbon and hydrogen to a reactor maintained at a temperature of 300° C. to 550° C., withdrawing reaction products therefrom and passing them to a catalyst chamber containing a hydrogenation catalyst under hydrogenating conditions, removing reacted mixture from the catalyst chamber and flowing it through a non-catalytic reaction zone at a temperature and pressure at which hydrogen is transferred from the hydroaromatic hydrocarbon present to the carbonaceous material undergoing treatment, and fractionating the reaction products to recover a fraction containing hydrogenation products of the reaction.

BERNARD S. GREENSFELDER.

REFERENCES CITED

The following references are of record in the file of this patent:

UNITED STATES PATENTS

| Number | Name | Date |
| --- | --- | --- |
| 1,711,499 | Hofsass | May 7, 1939 |
| 2,115,336 | Krauch et al. | Apr. 26, 1938 |
| 1,960,977 | Pier et al. | May 29, 1934 |
| 2,328,828 | Marschner | Sept. 7, 1943 |
| 2,191,157 | Pier et al. | Feb. 20, 1940 |
| 1,984,596 | Pier et al. | Dec. 18, 1934 |
| 2,339,108 | Pier et al. | Jan. 11, 1944 |

FOREIGN PATENTS

| Number | Country | Date |
| --- | --- | --- |
| 618,490 | France | Mar. 10, 1927 |